United States Patent

[11] 3,596,338

| [72] | Inventors | Edward M. Meehan<br>Southington;<br>William J. Morrissey, Sr., Naugatuck, both of, Conn. |
|---|---|---|
| [21] | Appl. No. | 839,262 |
| [22] | Filed | July 7, 1969 |
| [45] | Patented | Aug. 3, 1971 |
| [73] | Assignee | Fansteel Inc.<br>North Chicago, Ill. |

[54] TOOL AND HOLDER THEREFOR
3 Claims, 5 Drawing Figs.

[52] U.S. Cl. .................................................. 29/96
[51] Int. Cl. .................................................. B26d 1/00
[50] Field of Search .................................. 29/96, 97, 98

[56] References Cited
UNITED STATES PATENTS

| 2,450,365 | 9/1948 | Thompson et al. ......... | 29/96 |
| 2,675,604 | 4/1954 | Plummer ..................... | 29/96 |
| 2,737,705 | 3/1956 | Novkov ....................... | 29/96 |
| 3,028,657 | 4/1962 | Almen ......................... | 29/96 |
| 3,124,865 | 3/1964 | Clark et al. ................. | 29/96 |

FOREIGN PATENTS

| 989,133 | 4/1965 | Great Britain ............... | 29/96 |

Primary Examiner—Harrison L. Hinson
Attorney—Barnes, Kisselle, Raisch & Choate

ABSTRACT: An improved tool for use on lathes and other turning, tracing, or cutoff machinery of known construction which includes a side plate anvil held in place by a clamp which serves also as an adjustable backup for a cutting insert mounted on the anvil, and a clamping block which cooperates with the adjustable element for locking the anvil side plate in position as well as locking the cutting insert in place on the anvil.

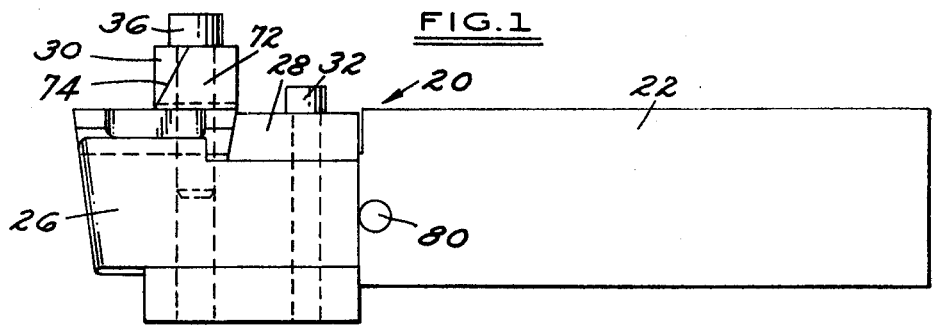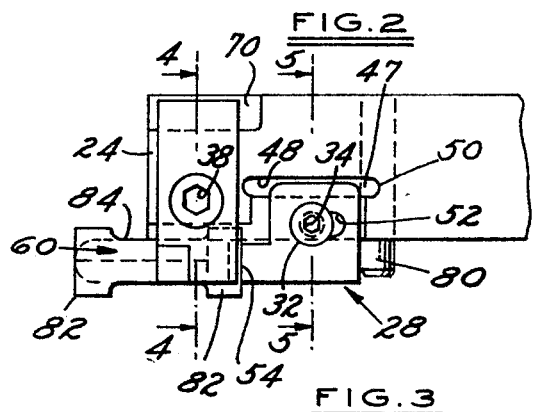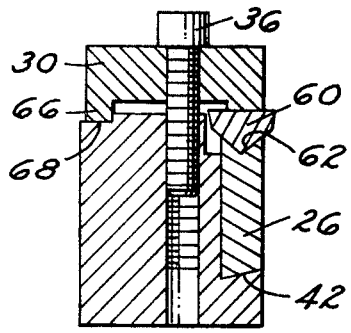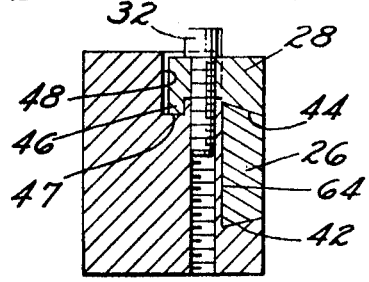

TOOL AND HOLDER THEREFOR

This invention relates to a Tool and Holder Therefor and more particularly to an improved type of turning, tracing, cutoff or parting tool which can be used on lathes and other turning equipment. An example of this type of cutoff tool is shown in U.S. Pat. No. 2,846,756, dated Aug. 12, 1958, this patent showing a side plate support for a cutoff tool insert which is bolted to the holder and utilizing also a clamp with a projecting nose portion which extends over the plate and the cutting insert to hold the insert on the plate.

It is an object of the present invention to provide a tool in which a side plate anvil or support for a cutoff insert is mounted on the side of a tool without the necessity of any perforate openings in the anvil or side plate, this being held in place by clamps which serve not only to exert downward pressure on the plate but also a pressure inwardly to force the plate against the tool body, one clamp providing also a forward surface to serve as a backup surface for a cutting insert having a fore and aft adjustment so that the insert may be ground and reground for use in several positions before the necessity of replacement. A forward clamp also serves to lock the insert in place as well as exerting further force to hold the side plate anvil in position.

Other objects and features of the invention will be apparent in the following description and claims in which the principles of operation and the use of the tool are set forth along with the best mode presently contemplated for the invention.

Drawings accompany the disclosure and the various views thereof may be briefly described as:

FIG. 1, a side view of an assembled tool.
FIG. 2, a top view of an assembled tool.
FIG. 3, a front view of an assembled tool.
FIG. 4, a sectional view on line 4—4 of FIG. 2.
FIG. 5, a sectional view on line 5—5 of FIG. 2.

REFERRING TO THE DRAWINGS:

There is shown a tool body 20 having a long rectangular shank 22 which serves to clamp the tool body in a suitable position and having a head portion 24 which serves to mount a side plate support anvil 26, a retaining and adjustment clamp 28, and a second retaining clamp 30, the first clamp being held by a headed bolt 32 having a cylindrical head with an Allen wrench recess 34, and the second clamp being held in position by a headed bolt 36 having a cylindrical head with an Allen wrench opening 38.

If the head of the tool is viewed in FIG. 3, it will be seen that there is provided a side extension 40 which extends outwardly from the shank 22 and which has an inwardly and downwardly extending angled surface 42 which forms a ledge serving as one portion of a reentrant groove, in this case a dovetail groove, the other portion being formed by a surface 44 on the first clamp 28 as shown in the sectional view on FIG. 5. The side plate anvil 26 has a beveled bottom edge surface to rest on the ledge 42, and on its top edge surface a forward portion grooved to receive a complemental portion of a cutting insert, and an aft portion beveled to complement surface 44 of clamp 28.

The clamp 28 has a heel portion 46 engaged in a slot 47 in the bottom of a recess 48 in the head portion of the tool, this recess being longer than a slide block portion 50 of the clamp 28 which is provided with an elongate hole 52 through which the screw 32 passes. The block 28 has a forward nose portion 54 which serves as a backup surface for a cutting insert 60 with a V-shaped bottom which is received in a V-shaped groove 62 in the forward portion of the top edge of the sideplate anvil 26.

Thus, it will be seen that by loosening the screw 34 the first clamp 28 can be moved fore or aft to adjust the forward position of the insert 60 at the groove 62. At the same time the tightening of the screw 34 will cause the surface 44, in conjunction with the surface 42, to urge the anvil sideplate 26 toward the wall 64 of the tool head and clamp it tightly. The heel 46 of clamp 28 is engaged in slot 47 to lock the clamp against side slip.

The second clamp element 30, as viewed from the front, extends transversely of the tool head and has a heel portion 66 which rests on a surface 68 in a small surface recess 70 on the top of the head. The clamp 30 extends across the tool head and has a clamping portion 72 which drops a little bit below the bottom surface of the clamp and bears against the top surface of inset 60. The front surface 74 of the clamping portion 72 is angled upwardly and back for chip clearance.

It will be seen that downward pressure of the clamp 30 by tightening of screw 36 will not only move the insert 60 tightly into the groove 62 but it will also tighten the forward end of the sideplate anvil 26 against the surface 42. A stop locator for the rearward end of the sideplate 26 is provided in the form of a pin 80 as shown in FIGS. 1 and 2 and this can also be provided by any suitable means such as a vertical ledge on the shank portion 22 if this is desired. This limits the rearward motion of the anvil but the anvil can be shifted forward to a degree to furnish good support for the insert 60 at the cutting end.

The particular insert 60 which is utilized in the tool may be formed of tungsten carbide or a similar hard cutting material and is double ended in the sense that it has two wide portions 82 so that the insert can be reversed to give double cutting time before replacement or regrinding. The ends are connected by a narrowed portion 84.

It will thus be seen that the first clamp 28 serves not only to retain the sideplate anvil 26 securely against the wall of the tool head but it also serves as a solid backup for the cutting insert 60. Thus, if this insert needs to be projected forward for any reason or requires adjustment after grinding, the clamp 28 can be moved forward to continue to provide a solid backup for the insert. Also, the clamp 30, in addition to securing the insert in its supporting groove, exerts downward pressure on the sideplate anvil 26 to effectively clamp the forward end of the anvil. Thus, the parts of the tool are securely clamped against vibratory forces while maintaining the ability to index readily and permitting a regrind adjustment.

The expressions: top, side, and bottom, as used in the specification and claims are for the purpose of defining relative positions, top meaning the portion nearest the cutting force regardless of whether the tool is being used in an inverted position as is sometimes done. The tool may be used for grooving, forming, turning and tracing, which involves traversing longitudinally along a work piece, as well as for a cutoff or parting tool using the so-called "plunge out."

We claim:
1. A toolholder to support a cutting insert which comprises:
   a. a tool body having a narrow ledge formed with a reentrant angle extending from a surface thereof,
   b. a narrow sideplate anvil having a beveled bottom edge to rest on and complemental to said angled ledge, and a top edge with a forward portion formed to support a cutting insert and an aft portion shaped with an angle opposed to the bottom edge to engage a clamp,
   c. a clamp adjustably positioned on said tool body having an angled surface to engage the aft portion of the top edge of said anvil to clamp said anvil downwardly on said ledge and against said surface of said body and a surface to engage an end of an insert on said anvil, and
   d. means to lock said clamp in a selected position to form a rearward stop for a cutting insert and to lock said anvil in position on said ledge.

2. A toolholder as defined in claim 1 in which a second clamp is positioned on said tool body to exert a downward force on an insert positioned on the top forward edge portion of said anvil and serving further to force said anvil against said ledge and said surface of said body.

3. A toolholder to support a cutting insert which comprises:
   a. a tool body having a narrow ledge extending from a surface thereof, b. a narrow flat sideplate anvil having a bottom edge to rest on said ledge with one side against said surface, and a top edge with a forward portion formed to support a cutting insert and an aft portion shaped to engage a clamp, c. a first clamp adjustably positioned on said tool body having a first surface to engage the aft portion of the top edge of said anvil to clamp said anvil downwardly on said ledge and against said body and a second surface to engage an end of an insert on said anvil, said first clamp surface and said ledge being shaped to interlock with the edges of said sideplate anvil to retain against displacement away from said tool body surface, d. means to lock said clamp in a selected position to form a rearward stop for a cutting insert and to lock said anvil in position on said ledge, and e. a second clamp positioned forward of said first clamp to contact and retain an insert supported on said anvil and to supplement the action of said first clamp in retaining said anvil against displacement away from said tool body surface.